United States Patent [19]

Kobayashi et al.

[11] Patent Number: 4,498,309

[45] Date of Patent: Feb. 12, 1985

[54] BLOWER CONTROL ARRANGEMENT FOR AIR CONDITIONING UNIT OR THE LIKE

[75] Inventors: Shinma Kobayashi, Hiratsuka; Eiji Ohsawa, Ebina, both of Japan

[73] Assignee: Nissan Shatai Company, Limited, Hiratsuka, Japan

[21] Appl. No.: 526,634

[22] Filed: Aug. 26, 1983

[30] Foreign Application Priority Data

Aug. 31, 1982 [JP] Japan ................. 57-150144

[51] Int. Cl.$^3$ ............................................. F25D 17/04
[52] U.S. Cl. ..................................... 62/186; 98/2.01; 165/43; 236/49
[58] Field of Search .................. 236/49; 237/12, 3 B; 165/12, 43; 98/2.01; 62/209, 186

[56] References Cited

U.S. PATENT DOCUMENTS 4,311,188  1/1982  Kojima et al. ................... 165/43 X
4,408,713 10/1983  Iijima et al. ........................ 236/49

Primary Examiner—William E. Wayner
Attorney, Agent, or Firm—Schwartz, Jeffery, Schwaab, Mack, Blumenthal & Koch

[57] ABSTRACT

The blower of an automotive air conditioning unit is energized according to a flexible schedule wherein the maximum and minimum voltages applied to the blower motor are varied in response to a plurality of sensed parameters which influence the environment controlled by the air conditioning unit so that during extremely hot and cold weather suitably powerful energization is realized while during milder weather the energization is limited to avoid unnecessary noise generation.

34 Claims, 7 Drawing Figures

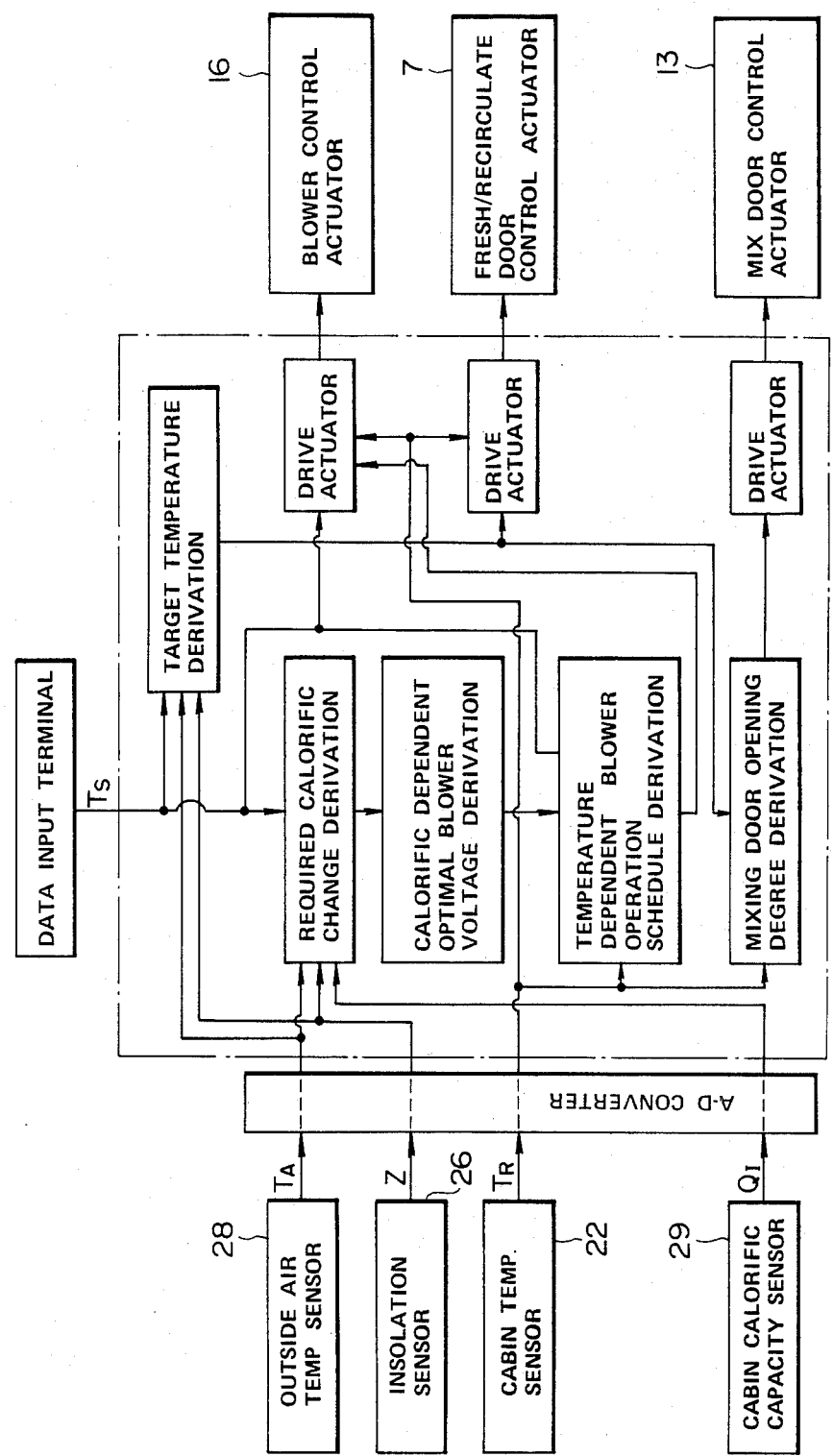

BLOWER CONTROL ARRANGEMENT FOR AIR CONDITIONING UNIT OR THE LIKE

BACKGROUND OF THE INVENTION

1. Field of the Invention

The present invention relates generally to an air conditioning unit of the type suitable for use in an automotive vehicle or the like, and more specifically to an improved blower control arrangement therefor.

2. Description of the Prior Art

In a previously proposed automotive air conditioner it has been arranged that the blower speed be varied according to a preset schedule so that when the temperature difference between the "desired" temperature and the "actual" cabin temperature reduces to a predetermined value, the blower speed is reduced at a given rate until reaching a minimum value. This minimum value is maintained while the above menttioned temperature difference remains within a predetermined narrow range.

However, this arrangement has proven only partially effective in that, if the maximum blower speed is selected to appropriately condition the vehicle cabin during extremely hot or cold weather, during milder weather this speed tends to be too high and produce an undesirable amount of noise under such conditions. When the rotational speed of the blower is selected so as to adequately maintain the desired vehicle cabin temperature during the aforementioned mild weather, however, the problem arises that during very hot and cold weather the blower power (especially the minimum power level) tends to be inadequate to maintain the cabin temperature and induces the blower speed to hunt.

SUMMARY OF THE INVENTION

It is accordingly an object of the present invention to provide an improved blower control arrangement with which, for any given set of vehicle cabin environmental conditions, the most appropriate blower energization schedule may be derived and implemented.

In brief the present invention features an arrangement in which the blower of an air conditioning unit is energized according to a flexible schedule wherein the maximum and minimum voltages applied to the blower motor are varied in response to a plurality of sensed parameters which influence the environment controlled by the air conditioning unit, so that during extremely hot and cold conditions suitably powerful energization is realized while during milder conditions the energization is automatically limited to avoid unnecessary noise generation.

More specifically, the present invention takes the form of an air conditioning unit for a vehicle having a cabin, and which comprises: a blower for inducing air to flow through a duct of the air conditioning unit, a heat exchanger associated with the duct and arranged to vary the temperature of the air induced to flow through the duct, a sensor arrangement for sensing at least one parameter affecting the environment of the cabin and outputting an indication thereof, and a control circuit for controlling the energization of the blower according to an energization schedule, an extremum of which is selectively varied in response to the output of the sensor arrangement.

BRIEF DESCRIPTION OF THE DRAWINGS

The features and advantages of the arrangement of the present invention will become more clearly appreciated from the following description taken in conjunction with the accompanying drawings in which:

FIG. 1 is a schematic representation of a computer controlled air conditioning arrangement adapted for use with an enclosed space such as the passenger cabin of an automotive vehicle or the like;

FIG. 7 is a schematic illustration of the functions of the microcomputer carried out in response to the inputted data from the various sensors employed in the various embodiments of the present invention.

DETAILED DESCRIPTION OF THE PREFERRED EMBODIMENTS

Figure 1:
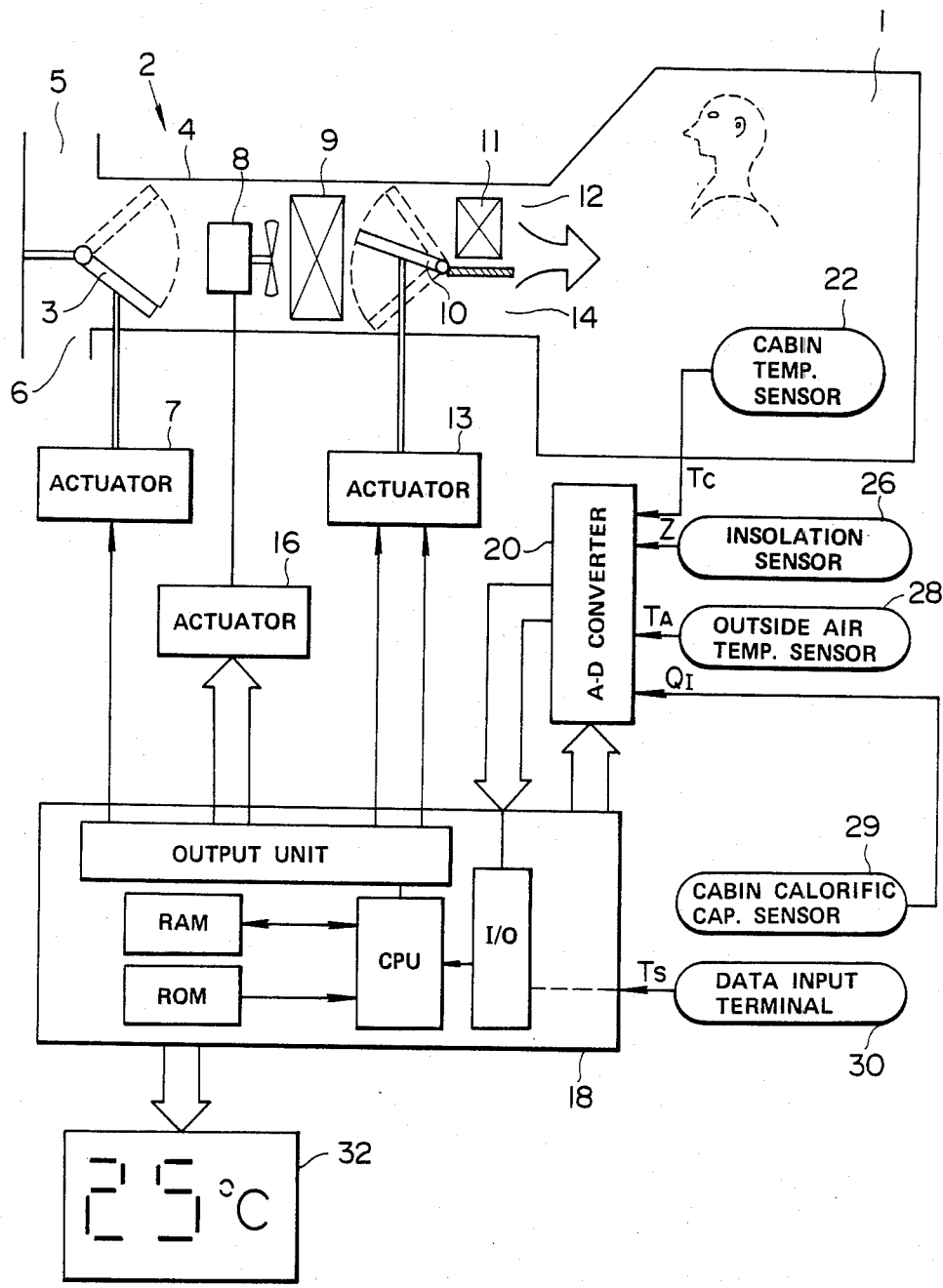

FIG. 1, shows an air conditioning arrangement to which the present invention may be applied. In this arrangement "air-conditioned air" is discharged into a vehicle cabin 1 or the like by an air conditioning unit generally indicated by the numeral 2. This air conditioning system or unit is, by way of example, the type wherein air may be selectively inducted from the ambient atmosphere surrounding the vehicle or from the cabin 1 per se to be recirculated back thereinto, via a door 3 mounted at or near the upstream end of a duct 4. The duct 4 is as shown, provided with an atmospheric air induction port 5 and a recirculation port 6. The position of the door 3 is controlled by an actuator 7.

Located downstream of the door 3 is a fan or blower 8.

Located downstream of the blower 8 is a evaporator 9 via which heat may be extracted from the air forced to flow through the duct 4 by the blower 8.

Further downstream of the evaporator 9 is a mixing door 10 followed by a heater core 11 through which heated fluid such as engine coolant is circulated in a known manner.

As shown, the heater core 11 is disposed in a sub passage 12 of the duct 4 so that the mixing door 10 (under the motive influence of an actuator 13) may be set to vary the fraction of air directed to flow through and/or over the heater core 11 as compared to that fraction which is forced to flow through a sub passage 14. With this arrangement the amount of heat imparted to the air introduced into the cabin may be controlled.

In this air conditioning unit the previously mentioned actuators (7, 13) are controlled along with a blower motor actuator 16 by a microcomputer 18 which receives inputs via an analog-digital (A-D) converter 20 from a plurality of sensors including a cabin temperature sensor 22, a sunlight intensity or insolation sensor 26, an outside or ambient air temperature sensor 28 and a sensor which shall be referred to as a "cabin calorific capacity" sensor 29. This latter mentioned sensor is arranged to sense (for example) the number of people in the cabin and/or any sources of heat which will influence the attainment of the "desired" temperature. This sensor may of course include seat switches responsive a person sitting on the seat to which the switch is associated, an infrared radiation detector or the like. Alternatively, in lieu of a sensor per se, a predetermined value may be set into the RAM of the microcomputer 18 in the event that circuit simplification is required. This value may be of the order of 500 calories (merely by way of example).

The computer further receives data input from a manually operable terminal 30 disposed in the cabin. This device serves to enable the "desired" or target cabin temperature ($T_S$) to be inputted by the cabin occupant or occupants to the microcomputer 18. In this instance the terminal is arranged to generate a digital output signal and therefore need not be connected through the A-D converter 20.

For convenience, a liquid crystal display 32 or the like may be provided to indicate one or both of the selected "desired" temperature and and actual cabin temperature.

Figure 2:
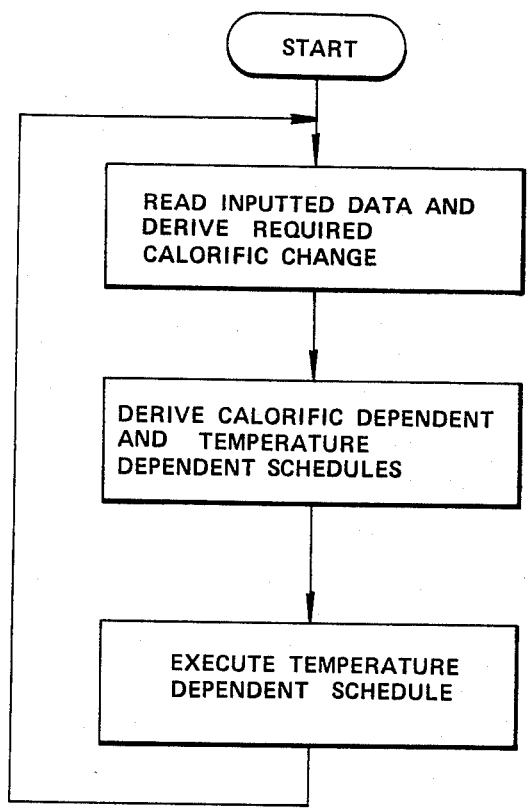
FIG. 2 is a simplified flowchart illustrating the basic procedure followed by the embodiment of the present invention.

FIG. 2 shows a simplified flowchart illustrating the procedure followed by the embodiments of the present invention. As shown, following the START of the program, the various data necessary for calculating the amount of heat which must be added or removed from the cabin in order to obtain the "desired temperature" is read and subsequently processed. After the amount of heat which must be removed (or added) is established, the program proceeds to the determine the most appropriate voltage/temperature schedule with which to energize the blower and then in the last stage proceeds to output commands to implement the aforementioned schedule.

Figure 3:
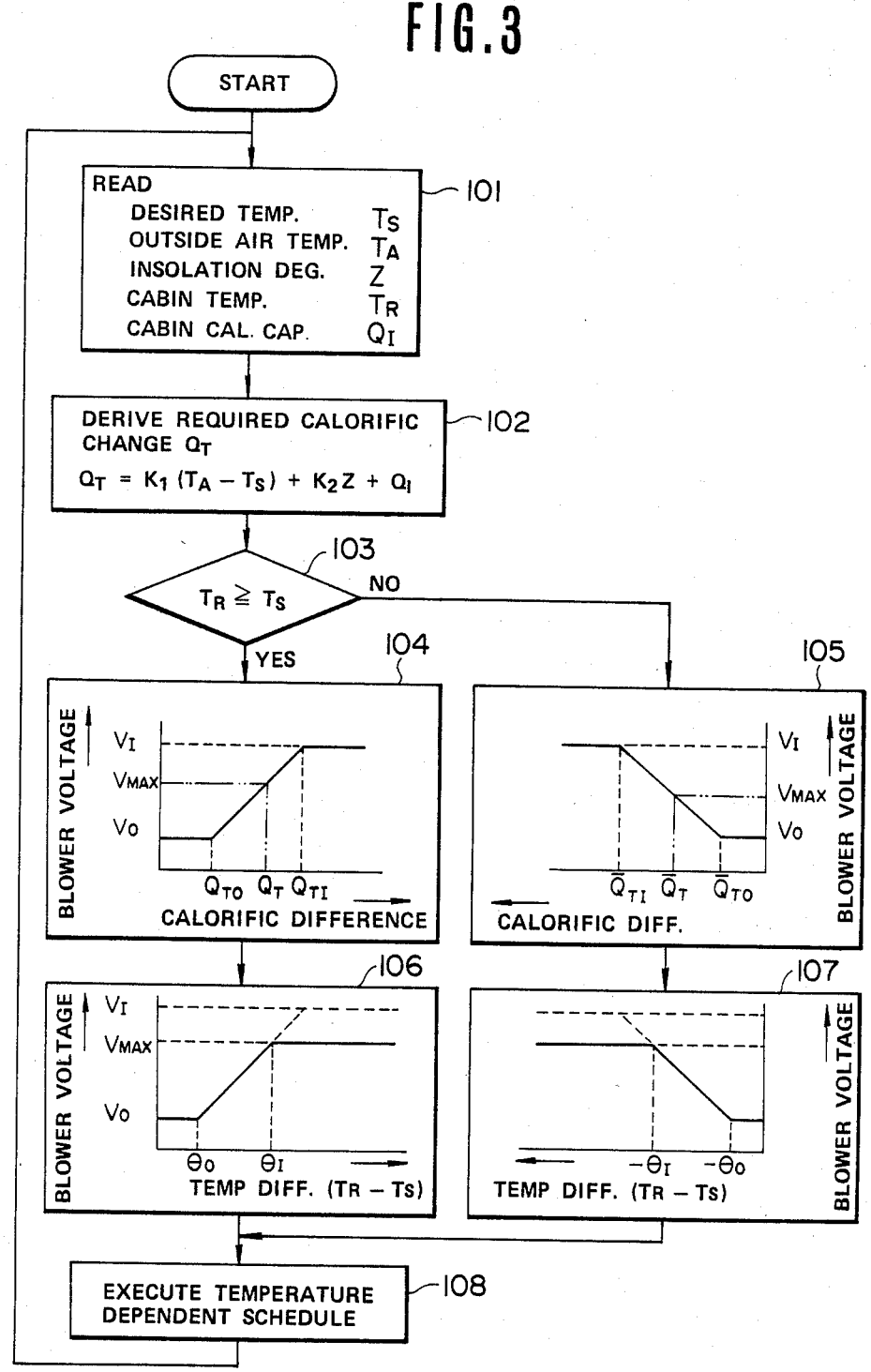
FIG. 3 is a flowchart showing in more detail the procedure which characterizes the embodiment of the present invention.

FIG. 3 shows in more detail the proceedure set forth in FIG. 2. As shown, following the START of the program the various necessary data are read in stage 101. Then, in stage 102 the program performs a calculation to determine the amount of heat which, in view of the manually selected "desired" temperature ($T_s$), must be added or subtracted from the cabin. The calculation is carried out using the following equation:

$$Q_T = K_1(T_A - T_S) + K_2 Z + Q_I$$

wherein:

$K_1$ and $K_2$ are constants;

$Q_T$ is the amount heat which must be added or removed from the cabin;

$T_A$ is the temperature of the air outside the cabin;

$T_S$ is the manually selected "desired" temperature;

Z is the degree of insolation; and $Q_I$ is the amount of heat produced by various sources within the cabin.

In stage 103 the program compares the actual cabin temperature $T_R$ with the desired temperature $T_S$ to ascertain the need to proceed alternatively to step 104 or 105. In the instance that the cabin temperature ($T_R$) is sensed to be equal to or greater than the desired temperature ($T_S$) the program will proceed to determine the most appropriate maximum voltage ($V_{MAX}$) with which to energize the air conditioner blower in the cooling mode. On the other hand, if the cabin temperature is lower than that required, the program will proceed in step 105, to determine the most appropriate maximum voltage with which to energize the blower in the heating mode.

As will apparent to those skilled in the art to which this invention pertains, steps 104 and 105 may be carried out using a simple two dimensional table look up. To this end it is possible to store a table of the nature shown in steps 104 and 105 in the ROM of the microcomputer. When using this table, if the value ($Q_T$) derived using the above mentioned equation falls (by way of example) between the predetermined values $Q_{TO}$ and $Q_{TI}$ then the look up will as shown in chain line, indicate the optimal voltage or $V_{MAX}$ to be at the illustrated value; viz., in this example lower than the absolute maximum $V_O$.

Alternatively, the optimal maximum energization voltage may be derived using a relatively simple program which does not involve a stored table.

In stage 106 the data derived in step 104 is utilized along with predetermined data such as the temperature difference range over which it is appropriate to reduce the blower speed (viz., $\theta_O - \theta_I$) to establish a new temperature dependent operation schedule. This newly established schedule will operate the blower using the above derived $V_{MAX}$ voltage until the temperature difference reaches a preset value of $\theta_1$ whereafter the energization of the blower will be gradually decreased until the minimum energization level $V_O$ is reached at a second preset temperature difference of $\theta_O$. The energization of the blower motor is maintained at this level until such time as the temperature difference exceeds the $\theta_O$ value whereupon the voltage will be gradually increased.

Step 107 is deemed essentially the same as step 106 with the exception that it relates to a heating mode, and is considered as such to not require any explantion.

In step 108 the schedule determined in step 106 or 107 is implemented.

In order to allow for variations which occur in weather and/or time of day, the program is arranged to recycle as shown, so as to periodically establish a new control schedule. For example, if a given schedule is established during a hot summer day, after nightfall the factors affecting the cabin environment will have changed markedly and obviously induce the need for a different control schedule. Of course the program may be arranged so that recycling only occurs at given intervals to avoid overly frequent renewal of the control schedule.

Figure 4:
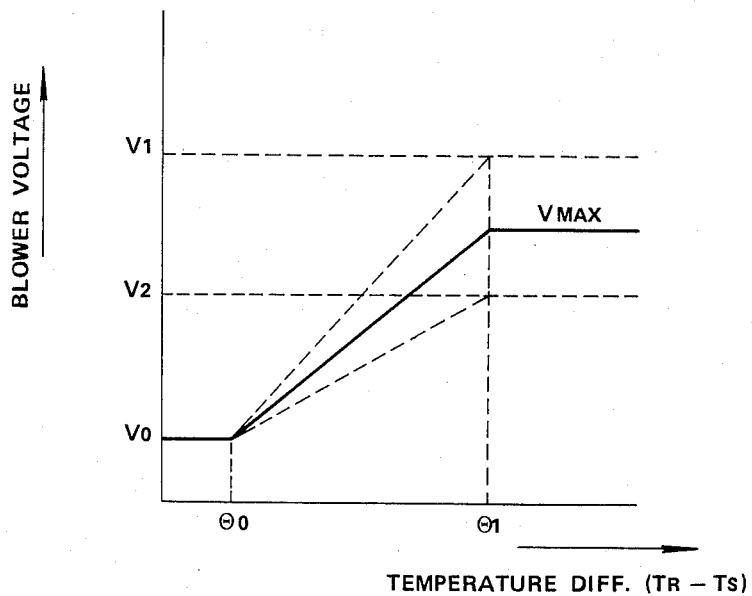
FIGS. 4 and 5 are graphs showing in terms of the voltage applied to the blower and the temperature difference between the "desired" temperature and the "actual" temperature, the temperature dependent control schedules derived in the program shown in FIG. 3.
Figure 5:
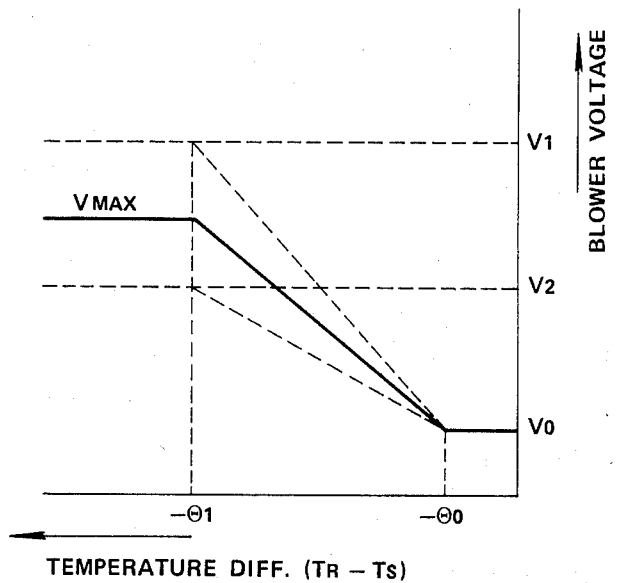

FIGS. 4 and 5 show in more detail the temperature dependent shedules derived in steps 106 and 107. As will be appreciated it is advantageous to limit the degree to which the voltage $V_{MAX}$ can be lowered. Hence, as shown, the the lower limit of $V_2$ is determined at approximately midway (merely by way of example) between the absolute maximum ($V_I$) and set minimum ($V_O$) voltages. This limitation, of course, can be effected in steps 104 and 105. Further as shown, the gradient of the sections interconnecting the maximum and minimum voltage levels (viz., the extrema) varies with the difference therebetween. As previously mentioned, the derivation of this section of the control schedule may be achieved using a simple equation (in program form).

Figure 6:
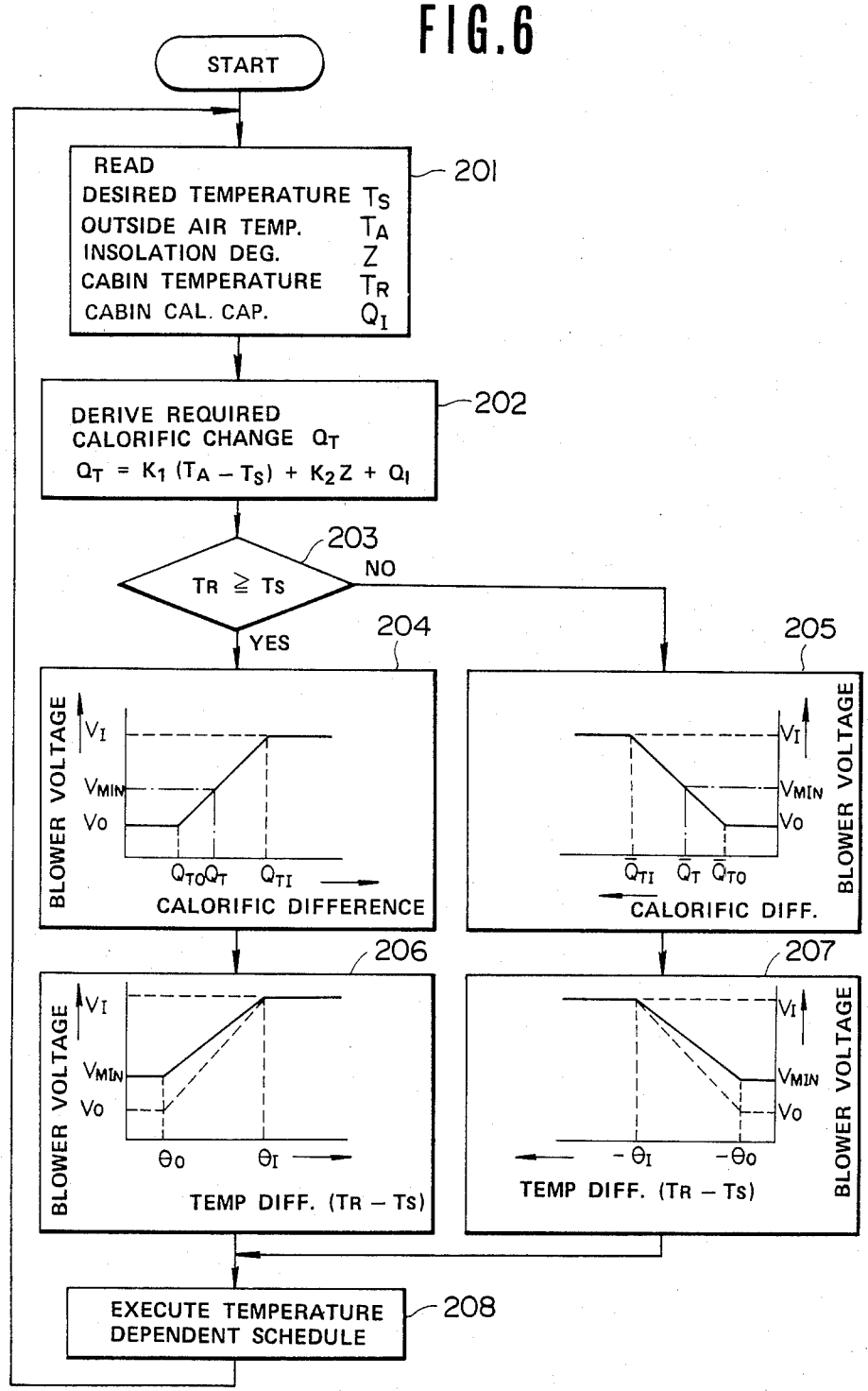
FIG. 6 shows a flowchart similar to that shown in FIG. 3, but wherein the minimum energization of the blower is modified in response to the sensed data.

FIG. 6 is a flowchart similar to that shown in FIG. 3 but wherein in order to maintain adequately low temperatures in extremely hot environments (for example a desert or the like) or keep the cabin adequately warm in freezing cold conditions, the normal minimum level of blower energization is advantageously raised. The decision as to how much to elevate the minimum voltage $V_O$ is made using a technique similar to that used in deriving the voltage $V_{MAX}$ in steps 104 and 105. viz., via table look up or by use of a suitable program.

FIG. 7 is a schematic illustration showing the operational interconnections between the various sensors, actuators and the microcomputer and which functionally shows the operations which take place within the microcomputer 18. However, it will be apparent that the function blocks shown in this figure, could be replaced with digital and/or analog circuits which would produce the same results, should it be desired to construct such a circuit.

What is claimed is:

1. An air conditioning unit for a vehicle having a cabin, comprising:
    a blower for inducing air to flow through a duct of said air conditioning unit;
    a heat exchanger arrangement associated with said duct and arranged to vary the temperature of the air induced to flow through said duct;
    a sensor arrangement for sensing at least one parameter affecting the environment of said cabin and outputting an indication of said parameter;
    a control circuit for controlling the energization of said blower according to an energization schedule, a first extremum of which is selectively varied in response to the output of said sensor arrangement, and for varying the rate at which said schedule proceeds from said first extremum to a second extremum in accordance with the difference between the extrema.

2. An air conditioning unit as claimed in claim 1, wherein said first extremum is the maximum level of blower energization.

3. An air conditioning unit as claimed in claim 1, wherein said sensor arrangement includes a cabin temperature sensor.

4. An air conditioning unit as claimed in claim 1, wherein said sensor arrangement includes a sensor for sensing the temperature of the air outside the vehicle.

5. An air conditioner as claimed in claim 1, wherein said sensor arrangement includes an insolation sensor for sensing the effect of sunlight on the environment of the cabin.

6. An air conditioning unit as claimed in claim 1, wherein said sensor arrangement includes a sensor for sensing the amount of heat which will be produced and/or required in the cabin.

7. An air conditioning unit as claimed in claim 1, further including a first device for selectively inducting air from one of the cabin and the atmosphere outside the vehicle, into said duct, said first device being controlled by said control circuit.

8. An air conditioning unit as claimed in claim 1, further comprising a second device for selectively varying the amount of air flowing in said duct which is exposed to said heat exchanger arrangement, said second device being controlled by said control circuit.

9. An air conditioning unit as claimed in claim 1, wherein said control circuit comprises a microcomputer incorporating therein a RAM, a ROM and a CPU.

10. An air conditioning unit as claimed in claim 9, wherein said microcomputer includes a program which determines the maximum voltage with which to energize said blower in response to the data inputted thereto by said sensor arrangement.

11. An air conditioning unit for conditioning air in an enclosed space, comprising:
    a blower for inducing air to flow through a duct of said air conditioning unit;
    a heat exchanger arrangement associated with said duct for varying the temperature of the air induced to flow through said duct;
    a senor arrangement for sensing at least one parameter affecting the environment of said enclosed space and outputting an indication thereof; and
    a processor for controlling the energization of said blower according to a derived schedule, said processor being arranged to derive said derived schedule by:
    (a) deriving, based on the data inputted to said processor by said sensor arrangement, the amount of heat which must be one of added to and subtracted from said enclosed space to achieve a desired temperature;
    (b) deriving, based on the amount of heat which must be one of added to and subtracted from said enclosed space, the optimal energization level for said blower; and
    (c) based on the latter derivation, deriving a temperature dependent schedule for energizing said blower.

12. An air conditioning unit as claimed in claim 11, wherein said optimal energization level is the maximum for which said blower should be energized in view of said at least one parameter affecting said environment of said cabin and the amount of noise produced by said blower.

13. A method of operating an air conditioning unit which conditions the air in an enclosed space; comprising the steps of:
    inducing air to flow through a duct of said air conditioning unit by using a blower;
    varying the temperature of said air induced to flow in said duct by said blower, by using a heat exchanger arrangement;
    sensing at least one parameter affecting the environment of said enclosed space using a sensor and outputting an indication thereof to a processor;
    energizing said blower according to a schedule derived by said processor via the steps of:
    deriving, based on the data inputted to said processor by said sensor arrangement, the amount of heat which must be one of added to and subtracted from said enclosed space to achieve a desired temperature;
    deriving, based on the derived amount of heat which must be one of added to or subtracted from said enclosed space, the optimal energization level for said blower; and
    based on said derived optimal energization level, deriving a temperature dependent schedule for energizing said blower.

14. A method as claimed in claim 13, wherein said optimal energization level is the maximum voltage which may be applied to said blower and which is selected in a manner to minimize the noise produced by said blower while optimizing the effect of said air conditioner on said enclosed space.

15. A method as claimed in claim 13, wherein said step of sensing at least one parameter comprises:
    sensing the temperature of the air outside said enclosed space;

sensing the temperature of the air within said enclosed space;
sensing the amount of heat being generated within said enclosed space other than by said air conditioning unit; and
sensing the insolation to which said enclosed space is subjected.

16. A method as claimed in claim 15 wherein said desired temperature is inputted to said processor using a manually operable terminal disposed within said enclosed space.

17. A method as claimed in claim 15 wherein the step of deriving the amount of heat which must be one of added and subtracted from said enclosed space is carried out using the equation:

$$Q_T = K_1(T_A - T_S) + K_2 Z + Q_I$$

wherein:
$K_1$ and $K_2$ are constants;
$Q_T$ is the amount heat which must be added to or removed from said enclosed space;
$T_A$ is the temperature of the air outside said enclosed space;
$T_S$ is the manually selected "desired" temperature;
$Z$ is the degree of insolation; and
$Q_I$ is the amount of heat produced by various sources within said enclosed space.

18. A method as claimed in claim 13, wherein said optimal energization level is derived by performing a table look in a memory of said processor.

19. A method as claimed in claim 13 wherein the steps of deriving the optimal level of energization and deriving said temperature dependent schedule are carried out using a program stored in a memory of said processor.

20. A blower control system for an automotive air conditioner comprising:
an induction system including means for adjusting a temperature of the air to be discharged into a vehicle compartment;
a blower disposed within said induction system and energizing the air flowing through said induction system, said blower being driven at various speeds within a predetermined variation range;
a detector detecting a parameter which affects the temperature condition in the vehicle compartment, said detector producing a detector signal having a value representative of the detected parameter; and
a controller deriving a heat value affecting air conditioning relative to a desired vehicle compartment air temperature in the vehicle compartment on the basis of said detector signal value and deriving said variation range of blower speed on the basis of the derived heat value, said controller deriving a control signal having a value representative of the blower speed within the derived variation range according to a predetermined schedule.

21. The blower control system as set forth in claim 20, wherein said controller varies the maximum blower speed depending upon the derived heat value.

22. The blower control system as set forth in claim 21, wherein said detector detects at least one of an ambient air temperature, an insolation value and a vehicle compartment air temperature.

23. The blower control system as set forth in claim 22, which further comprises a means for setting a desired vehicle compartment air temperature.

24. The blower control system as set forth in claim 23, wherein said controller derives said control signal value on the basis of a different between the desired temperature and the vehicle compartment air temperature.

25. The blower control system as set forth in claim 24, wherein said controller varies a variation pattern of the blower speed corresponding to the varied variation range of the blower speed.

26. A blower control system for an automotive air conditioner comprising:
an induction system including means for adjusting a temperature of the air to be discharged into a vehicle compartment;
a blower disposed within said induction system and energizing the air flowing through said induction system, said blower being driven at various speeds within a predetermined variation range;
a detector detecting a parameter which affects the temperature condition in the vehicle compartment, said detector producing a detector signal having a value representative of the detected parameter; and
a controller associated with said blower for feeding a control signal to adjust the driving speed of said blower according to a predetermined schedule, said controller being responsive to said detector signal for varying said schedule depending upon the value of said detector signal.

27. The blower control system as set forth in claim 26, wherein said controller derives the driving speed of the blower depending upon a temperature difference between a vehicle compartment air temperature and a desired temperature which is preset by means of a presetting means, and varies a variation pattern of the blower speed depending upon the temperature difference.

28. The blower control system as set forth in claim 27, wherein said controller varies the variation range of the blower speed depending upon the detector signal value.

29. The blower control system as set forth in claim 28, wherein said controller varies said variation pattern of the blower speed corresponding to the varied variation range of the blower speed.

30. The blower control system as set forth in claim 29, wherein said controller varies the maximum blower speed depending upon the detector signal value.

31. The blower control system as set forth in claim 30, wherein said detector detects at least one of an ambient air temperature, an insolation value and a vehicle compartment temperature.

32. An air conditioning system for a vehicle passenger cabin, comprising:
a blower for inducing air flow;
a blower driver connected to said blower for producing a blower drive voltage for driving said blower;
a sensor for sensing cabin heat content and temperature and producing respective indications of said cabin heat content and temperature; and
control means, responsive to said sensor, and connected to said blower driver, for deriving a function in accordance with said sensed cabin heat content and temerature, and for causing said driver blower to vary the magnitude of said blower drive voltage in accordance with said derived function using sensed cabin temperature as a variable.

33. A system as claimed in claim 32, wherein said control means further determines a maximum blower drive voltage corresponding to a maximum cabin temperature and a minimum blower drive voltage corresponding to a minimum cabin temperature.

34. As system as claimed in claim 33, wherein said function is such that said blower drive voltage remains at said minimum blower drive voltage when the cabin temperature is below said minimum cabin temperature, said blower drive voltage remains at said maximum blower drive voltage when said cabin temperature is above said maximum cabin temperature, and said blower drive voltage varies linearly with cabin temperature between said maximum blower drive voltage at said maximum cabin temperature and said minimum drive voltage at said minimum cabin temperature, inclusively, when said cabin temperature is between said maximum cabin temperature and said minimum cabin temperature.

* * * * *